A. L. BRETT.
CHECK VALVE FOR REFRIGERATING APPARATUS.
APPLICATION FILED SEPT. 1, 1916.
1,242,515.
Patented Oct. 9, 1917.
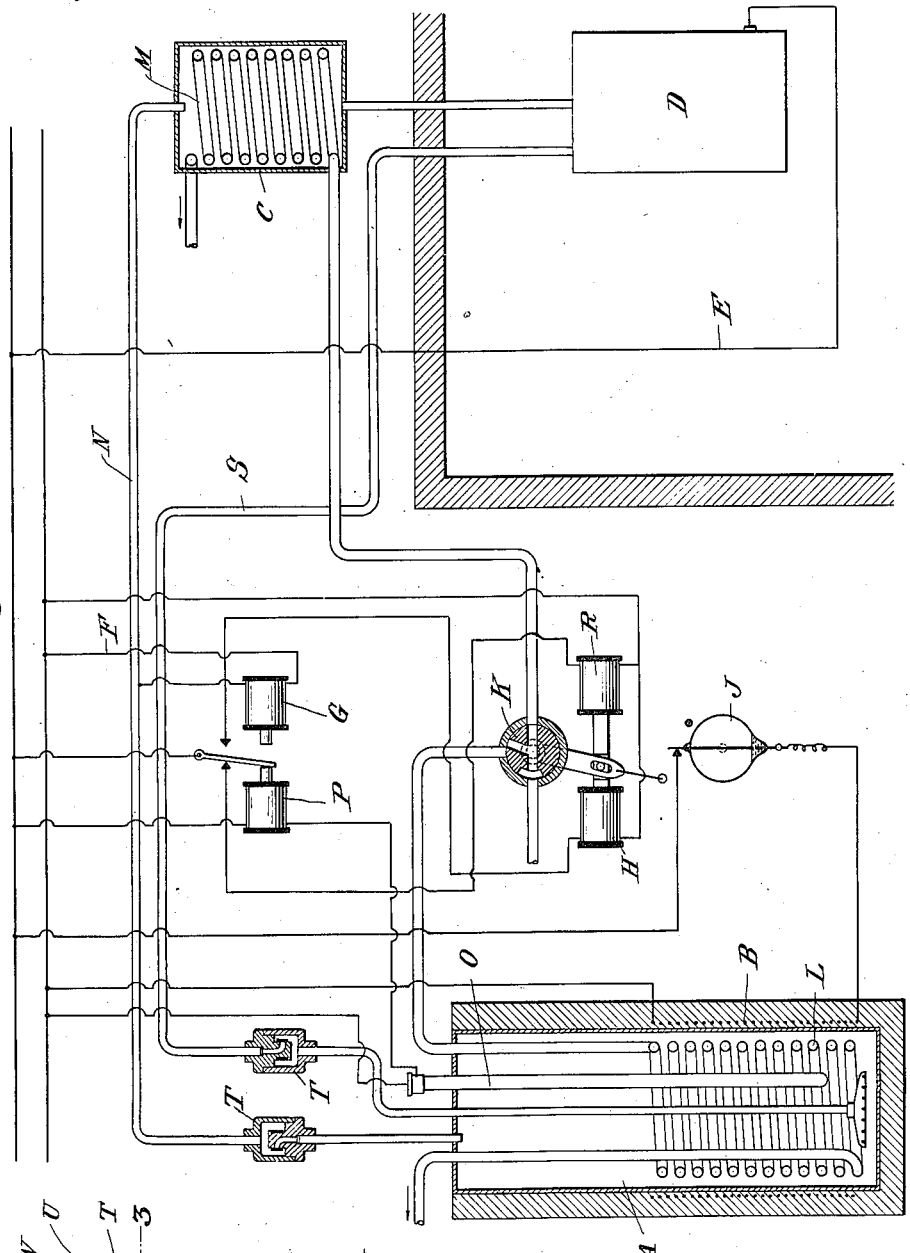
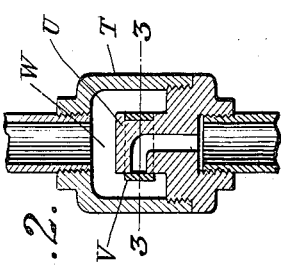

UNITED STATES PATENT OFFICE.

A LEO BRETT, OF SOUTH BRAINTREE, MASSACHUSETTS.

CHECK-VALVE FOR REFRIGERATING APPARATUS.

1,242,515.     Specification of Letters Patent.     Patented Oct. 9, 1917.

Application filed September 1, 1916. Serial No. 117,968.

*To all whom it may concern:*

Be it known that I, A LEO BRETT, a citizen of the United States, residing at South Braintree, in the county of Norfolk and State of Massachusetts, have invented certain new and useful Improvements in Check-Valves for Refrigerating Apparatus, of which the following is a full, clear, and exact description.

In certain and now well known systems of artificial refrigeration adapted for continuous and automatic operation, the volatile constituents of a suitable refrigerating composition are driven over by the action of heat, from a distilling chamber to a condenser, and then utilized for refrigeration.

In these systems when the ammonia from the refrigerating mixture, which is generally used has been completely or to any extent driven over from the distilling chamber, the source of heat, generally by automatic means is shut off, and water passed through cooling coils in or about the chamber to assist the absorbent elements in the same to take up the ammonia from the refrigerating chamber. There is thus a flow of ammonia vapor in two directions, from the distilling to the condensing chamber, and back from the refrigerating to the distilling chamber to permit of which two pipes or conduits are employed with a check valve in each, the two valves opening in opposite directions.

In apparatus in which the continued operation is purely automatic it is quite a serious problem to find check valves which will indefinitely and with absolute certainty perform their allotted functions. It is required of them that they shall be sensitive in operation, that they must not leak to the slightest extent, and that they must be proof against wear and deterioration, but no ordinary form of valve meets all of these conditions.

In seeking a means to overcome these obstacles to perfect and long continued operation, I have found that if I use valves which in themselves are of an old and well known form, that is simple, rigid tubes with a side orifice covered by a soft rubber tube, such as were formerly employed for inflating bicycle tires, I not only have a sufficiently sensitive and efficient valve, but that the rubber tubes, so long as they are exposed to the action of ammonia in gaseous or liquid form retain their original properties, and never deteriorate as they would, eventually, if exposed to the air.

I therefore use these valves in the two ammonia tubes, in apparatus of this character, turning them in opposite directions so that they serve as check valves, permitting in each pipe a flow in but one direction. In this combination of old elements producing highly new and beneficial results the invention, subject of my present application, resides.

In the accompanying drawing I have illustrated so much of the apparatus and the valves themselves as is necessary to a full understanding of the invention:—

Figure 1 is a diagrammatic illustration of the refrigerating system as a whole.

Fig. 2 is an enlarged sectional view of one of the check valves, and

Fig. 3 is a cross sectional view through the valve.

As a general description of the system it may be stated that A is a distilling chamber containing a suitable refrigerating mixture, for example ammonium nitrate, water and ammonia, the volatile constituents of which, by means of an electric heating coil B, are driven over to a condensing chamber C whence the liquefied ammonia passes through a refrigerating chamber D.

The apparatus is so designed that when the ammonia in the chamber D falls to a certain point, the circuit is closed through wire E, the metal apparatus and wire F and energizes an electromagnet G that operates to close the circuit through a magnet H that turns a water valve K for directing the flow of water from a suitable source to and through pipes M in the condensing chamber and at the same time closes the circuit through the heating coils B by operating a circuit closer J. The volatile contents of the chamber A are therefore again driven over to the condensing chamber through the pipe N.

On the other hand after this action has continued until the temperature of the distilling chamber reaches a certain point, say 100° C., a thermostatic device O in the distilling chamber closes the circuit at magnet P which energizes magnet R that breaks the circuit through the heating coil G and diverts the flow of water from the pipes M of the condensing chamber to the pipes L of the distilling chamber. The reverse action thereupon takes place, or, in other words, the ammonia flows back from the refrigerating to the distilling chamber where it is absorbed.

It is manifest that the pipe S which leads the ammonia back to the distilling chamber must be a separate path from the pipe N that leads it to the condensing chamber, and that each of these pipes must contain a check valve, which valves limit the flow of ammonia to one direction. For this purpose I place in the pipes N and S two valves T each of which is composed of a rigid tubular portion U with a perforation or passage opening in its side, and a soft india rubber tube V surrounding the rigid tube in a suitable chamber W.

By placing these valves in relatively inverted positions the valve in the pipe N permits the ammonia to pass from the distilling to the condensing chamber only, while that in pipe S permits its return only.

As above stated these valves do not deteriorate so long as they are in an atmosphere of ammonia, and they constitue not only an extremely simple but a highly efficient means for controlling the flow of ammonia.

What I claim as my invention is:—

1. A check valve composed of a rigid tube having an orifice in its side covered with a soft rubber tube, in combination with a pipe or conduit in an apparatus containing ammonia, so that the valve will be constantly exposed to the action thereon of that substance.

2. In an apparatus of the kind described, the combination with a pipe or conduit containing ammonia of a check valve comprising a rigid body with an orifice closed by soft sheet rubber which permits a flow through it in one direction only.

In testimony whereof I affix my signature.

A LEO BRETT.